United States Patent
Stähtlin et al.

(10) Patent No.: US 10,118,626 B2
(45) Date of Patent: Nov. 6, 2018

(54) FUSION OF CHASSIS SENSOR DATA WITH VEHICLE DYNAMICS DATA

(75) Inventors: Ulrich Stähtlin, Eschborn (DE); Klaus Rink, Rodenbach (DE); Stefan Günthner, Frankfurt am Main (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 111 days.

(21) Appl. No.: 14/343,994

(22) PCT Filed: Sep. 12, 2012

(86) PCT No.: PCT/EP2012/067860
§ 371 (c)(1),
(2), (4) Date: May 23, 2014

(87) PCT Pub. No.: WO2013/037839
PCT Pub. Date: Mar. 21, 2013

(65) Prior Publication Data
US 2014/0257634 A1  Sep. 11, 2014

(30) Foreign Application Priority Data
Sep. 12, 2011 (DE) .................. 10 2011 082 530

(51) Int. Cl.
*B60W 40/10* (2012.01)
*B60W 50/00* (2006.01)
*B60W 40/076* (2012.01)

(52) U.S. Cl.
CPC .......... *B60W 40/10* (2013.01); *B60W 40/076* (2013.01); *B60W 50/0098* (2013.01); *B60W 2050/0088* (2013.01); *B60W 2520/00* (2013.01)

(58) Field of Classification Search
CPC ............... B60W 40/10; B60W 40/076; B60W 50/0098; B60W 2520/00; B60W 2050/0088
See application file for complete search history.

(56) References Cited

U.S. PATENT DOCUMENTS

| | | | | |
|---|---|---|---|---|
| 7,194,341 B2* | 3/2007 | Altenkirch | ....... | B60G 17/01908 340/440 |
| 2004/0153227 A1 | 8/2004 | Hagiwara et al. | | |
| 2006/0155440 A1 | 7/2006 | Gleacher | | |
| 2008/0133066 A1* | 6/2008 | Takenaka | ......................... | 701/1 |

(Continued)

FOREIGN PATENT DOCUMENTS

| | | |
|---|---|---|
| DE | 10 2004 019928 A1 | 11/2005 |
| EP | 1 826 037 A1 | 8/2007 |
| WO | WO 2011/098333 A1 | 8/2011 |

OTHER PUBLICATIONS

German Examination Report dated Feb. 14, 2013.
International Search Report.

*Primary Examiner* — Jelani A Smith
*Assistant Examiner* — Kelly D Williams
(74) *Attorney, Agent, or Firm* — Brinks Gilson & Lione

(57) ABSTRACT

A system for processing sensor data in a vehicle has a processor and a chassis sensor in communication with the processor. The processor is configured to record driving dynamics data and chassis sensor data for the vehicle, and filter driving dynamics data or the chassis sensor data on the basis of the chassis sensor data or the driving dynamics data.

12 Claims, 2 Drawing Sheets

(56) References Cited

U.S. PATENT DOCUMENTS

2008/0189003 A1* 8/2008 Gillula .................. G05D 1/028
  701/24
2009/0071772 A1* 3/2009 Cho .................... B60G 17/016
  188/266.4
2011/0276239 A1* 11/2011 Nagashima ............. F02D 37/02
  701/54

* cited by examiner

FUSION OF CHASSIS SENSOR DATA WITH VEHICLE DYNAMICS DATA

CROSS REFERENCE TO RELATED APPLICATION

This application claims priority to German Patent Application No. 10 2011 082 530.4, filed Sep. 12, 2011 and PCT/EP2012/067860, filed Sep. 12, 2012.

FIELD OF THE INVENTION

The invention relates to a method for processing sensor data in a vehicle, a control apparatus for performing the method and to a vehicle having the control apparatus.

BACKGROUND

WO 2011/098 333 A1 discloses the practice of using various sensor variables in a vehicle in order to improve already existent sensor variables or to generate new sensor variables and hence to enhance the recordable information.

It is an object to improve the use of a plurality of sensor variables for enhancing information.

The object is achieved by the features of the independent claims. Preferred developments are the subject matter of the dependent claims.

SUMMARY AND INTRODUCTIONARY DESCRIPTION OF THE INVENTION

According to one aspect of the invention, a method for processing sensor data in a vehicle comprises the steps of recording of driving dynamics data and chassis sensor data for the vehicle, and filtering of the driving dynamics data or the chassis sensor data on the basis of the chassis sensor data or the driving dynamics data.

The invention is based on the consideration that chassis sensors record location data for the vehicle above the roadway. In this case, location data are intended below to cover all data that contain position data, speed data and/or acceleration data in any way. They are therefore intended to be delimited from position data, in particular, which merely contain path information and locate the vehicle relatively or absolutely in the space at a quite particular time.

On the basis of the consideration, the invention recognizes that these location data from the chassis sensors together with the driving dynamics sensors could be used in order to enhance the information content of the data that comprise vertical location data for the vehicle and hence the location data of the vehicle above the roadway.

In this case, it is either possible to filter the driving dynamics data on the basis of the chassis data, or vice versa. In this case, filtering is intended to cover any desired analog or digital signal processing measure with which the two data types can be juxtaposed in order to enhance the information content thereof. This may thus involve the performance of pure averaging without further allowances for other factors such as noise. If noise also needs to be considered, a state observer or a Kalman filter would be suitable as a filter. If the shape of the noise also needs to be considered, it would be possible to use a particle filter if need be, which has a basic set of available noise scenarios and selects the noise scenario that needs to be taken into account for the elimination, for example using a Monte Carlo simulation.

In one development of the specified method, vertical location data for the vehicle from the chassis sensor data are combined in order to filter the driving dynamics data or the vertical driving dynamics data for the vehicle. As already mentioned, in this way it is possible to find differences between the two data types and hence errors in the measurement-oriented recording of data that relate to the vertical location of the vehicle above the roadway.

Preferably, the vertical driving dynamics data comprise roll and pitch angle speeds and also vertical accelerations of the vehicle, so that these data can be specified with a higher level of reliability.

In a particular development, the chassis sensor data comprise vertical position data and/or body acceleration data.

This development is based on the consideration that vertical position sensors are usually installed at various points on the chassis of the vehicle in order to record the vertical location of these points above the ground. The overall location of all points then reveals whether or not the chassis of the vehicle is parallel to the ground, so as to implement dazzle protection for oncoming traffic in relation to the vehicle in the case of a vehicle with xenon light, for example. The vertical location of the vehicle as recorded using the chassis sensors can then be used to plausibilize the vertical dynamics of the vehicle that are recorded using the driving dynamics sensors, for example after said location has been derived twice over time. On the other hand, the vertical dynamics could in turn be used to improve data that are obtained from the vertical position sensor, such as the vehicle mass and the distribution thereof.

By contrast, body acceleration sensors are usually installed at various points on the chassis of the vehicle in order to record vertical movements in these points relative to other points on the chassis of the vehicle, for example so that an active chassis can immediately react when the vehicle is moved from its parallel location in relation to the roadway base. The vertical movements could be compared directly with the vertical dynamics from the driving dynamics sensors. In addition, the earth's gravitational field compensation that is performed from the body acceleration sensors could be improved.

In a particularly beneficial manner, a combination of the vertical position sensors and the body acceleration sensors with the inertial sensors involves three different sensor types being available for recording the vertical dynamics of the vehicle, which could be filtered against one another in order to enhance the recordable information.

In one particular embodiment, the specified method comprises the steps of recording of an absolute position for the vehicle, for example using a GNSS signal, such as a GPS signal, and updating of the recorded absolute position on the basis of the driving dynamics sensors.

This development is particularly beneficial because the improved vertical dynamics data can now also be used to record vertical positions for the vehicle at places without a GNSS signal, such as in a parking block or an underground parking lot.

In another development of the specified method, a roadway inclination is ascertained on the basis of the chassis sensor data for the purpose of filtering, with the driving dynamics data being filtered on the basis of the roadway inclination.

The specified development is based on the insight that the chassis sensor data can be used to record not only the location of the vehicle above the roadway but also, conversely, the location of the roadway in relation to the vehicle. It is thus possible to establish when the roadway begins to incline upward or downward on a mountain. This additional information can likewise be used for plausibilizing sensor data.

In particular, this can be taken into account when filtering the driving dynamics if standstill calibration for the vehicle is performed with the driving dynamics data on the basis of the roadway inclination. If the vehicle is on a hillside, the driving dynamics data could erroneously output a movement of the vehicle, but this can be plausibilized using the measured roadway inclination.

According to a further aspect of the invention, a control apparatus is set up to perform a specified method.

In a development of the specified control apparatus, the specified apparatus has a memory and a processor. In this case, the specified method is stored in the memory in the form of a computer program, and the processor is provided for the purpose of executing the method when the computer program is loaded from the memory into the processor.

According to a further aspect of the invention, a computer program comprises program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

BRIEF DESCRIPTION OF THE DRAWINGS

According to a further aspect of the invention, a vehicle comprises a specified control apparatus.

The properties, features and advantages of this invention that are described above and also the manner in which they are achieved become clearer and more distinctly comprehensible in connection with the description below of the exemplary embodiments, which are explained in more detail in connection with the drawings, in which.

In the Figures, technical elements that are the same are provided with the same reference symbols and are described only once.

FURTHER DESCRIPTION OF THE INVENTION

Figure 1:
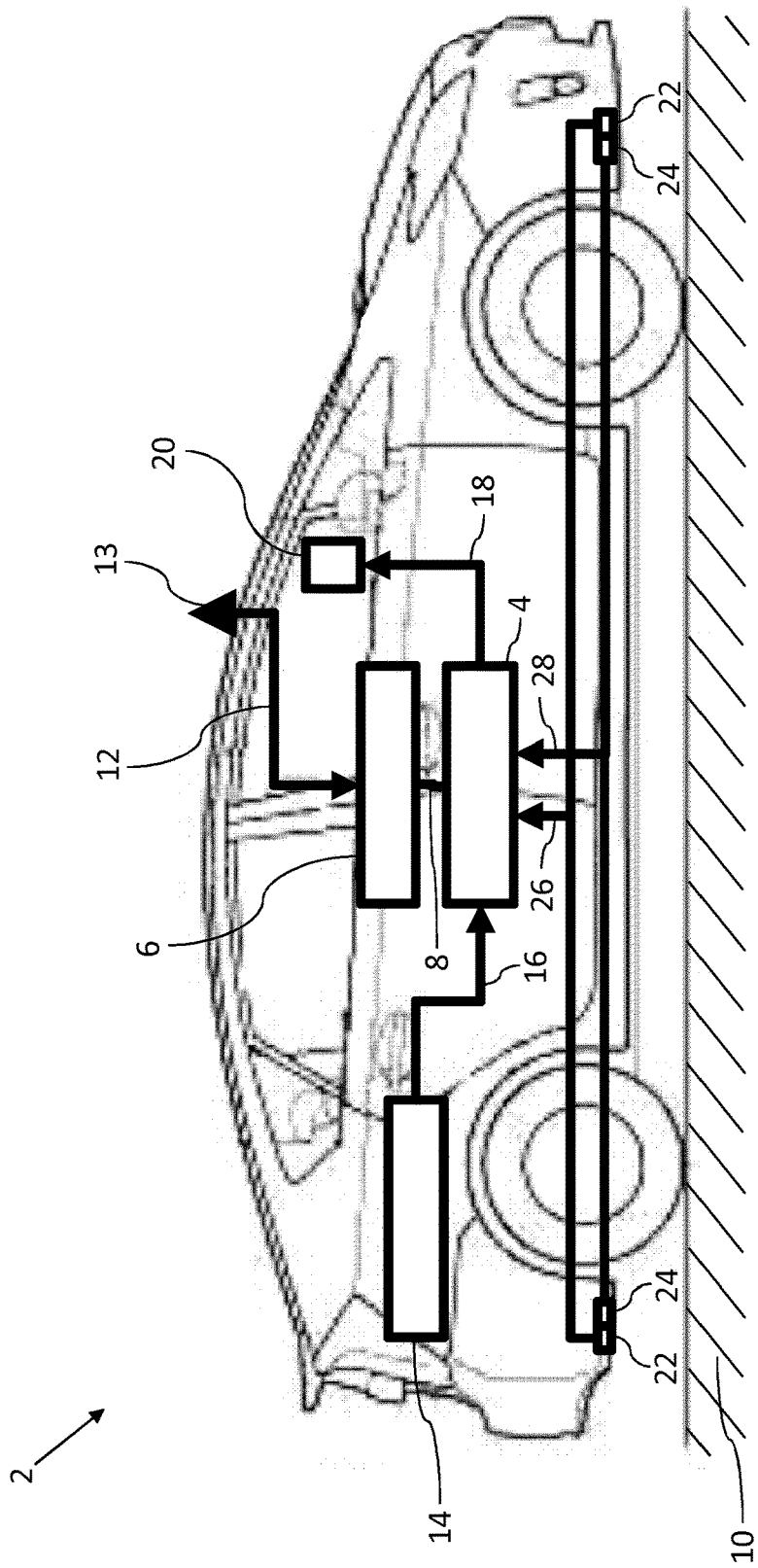
FIG. 1 illustrates a basic illustration of a vehicle with a fusion sensor.

Reference is made to FIG. 1, which shows a basic illustration of a vehicle 2 with a fusion sensor 4.

In the present embodiment, the fusion sensor 4 uses a GNSS receiver 6 to receive position data 8 for the vehicle 2 that indicate an absolute position for the vehicle 2 on a roadway 10. In the present embodiment, these position data 8 are derived from a GNSS signal 12 in the GNSS receiver 6 in a manner that is known to a person skilled in the art, said signal being received via a GNSS antenna 13. For details in this regard, reference is made to the relevant literature in the art.

The fusion sensor 4 is designed—in a manner that is yet to be described—to enhance the information content of the position data 8 derived from the GNSS signal 12. This is firstly necessary because the GNSS signal 12 may have a very high signal-to-noise band ratio and may thus be very inaccurate. Secondly, the GNSS signal 12 is not always available.

In the present embodiment, the vehicle 2 also has an inertial sensor 14 that records driving dynamics data 16 for the vehicle 2. These are known to include a longitudinal acceleration, a lateral acceleration and also a vertical acceleration and a roll rate, a pitch rate and also a yaw rate for the vehicle 2 or a subset of these six variables. In the present embodiment, these driving dynamics data 16 are used in order to enhance the information content of the position data 8 and to define the position of the vehicle 2 on the roadway 10 more precisely. The more precisely defined position 18 can then be used by a navigation appliance 20 itself when the GNSS signal 12 is not available at all, for example in a tunnel.

To further enhance the information content of the position data 8, the present embodiment also involves the use of vertical position sensors 22 and body acceleration sensors 24 that are mounted on the chassis of the vehicle 2 and record vertical distances 26 from the roadway 10 and vertical accelerations 28 in relation to the roadway 10 as appropriate.

By way of example, the vertical distances 26 from the roadway 10 that are recorded by the vertical position sensors 22 can be used to determine a mean vertical distance of the vehicle 2 from the roadway, an inclination and gradient of the roadway 10, a mass of the vehicle 2 and the distribution thereof and also the roll and pitch rates of the vehicle 2.

The vertical accelerations 28 recorded by the body acceleration sensors 24 can be used to determine an overall vertical acceleration for the vehicle 2, a location for the vehicle 2 relative to the earth's gravitational field and also the roll and pitch rates of the vehicle 2.

Figure 2:
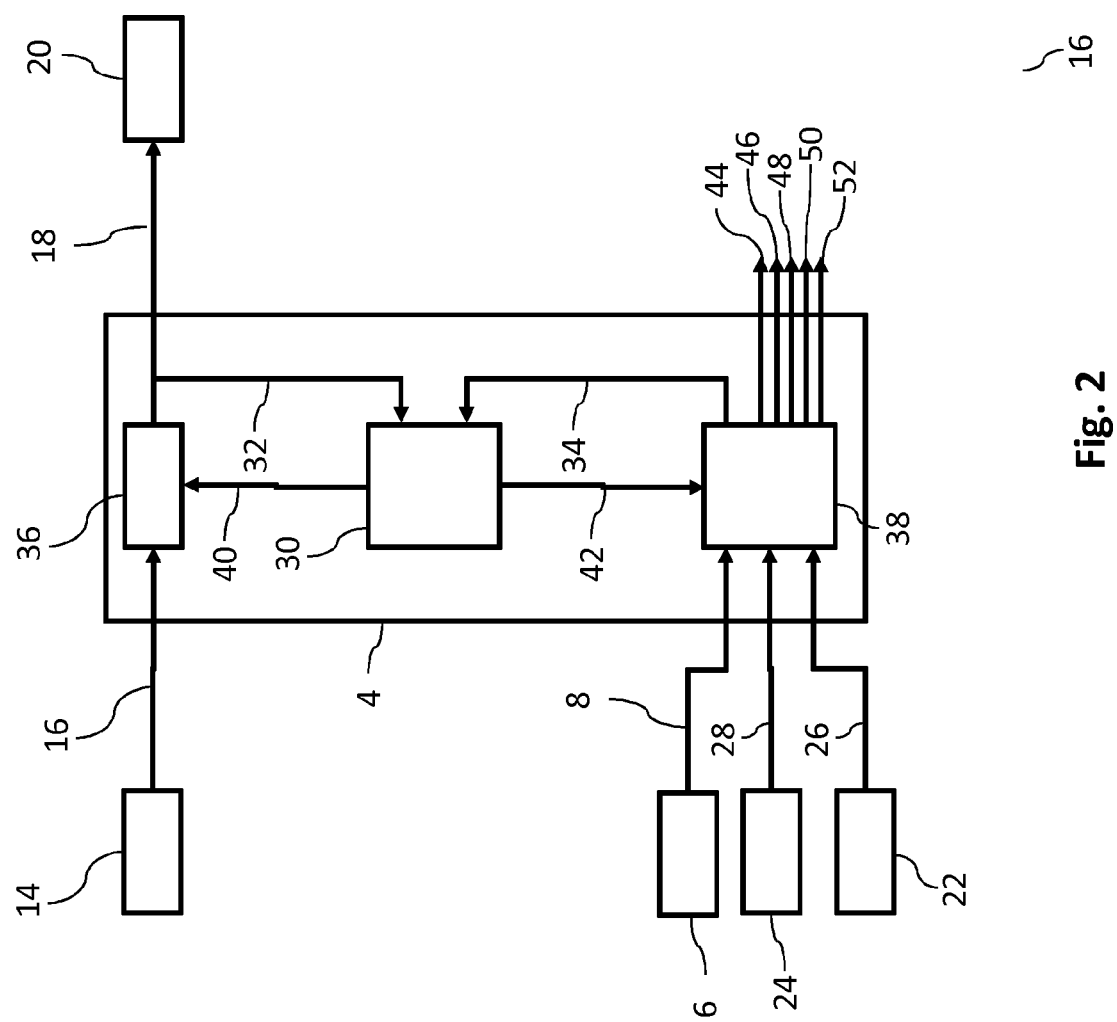
FIG. 2 illustrates a basic illustration of the fusion sensor from FIG. 1.

Reference is made to FIG. 2, which shows a basic illustration of the fusion sensor 4 from FIG. 1.

The fusion sensor 4 receives the measurement data already mentioned in FIG. 1. The fusion sensor 4 is intended to output the more precisely defined position data 18. A basic concept in this regard is juxtaposition of the information from the position data 18 from the GNSS receiver 6 with the driving dynamics data 16 from the inertial sensor 14 into a filter 30 and thus increasing of a signal-to-noise band ratio in the position data 18 from the GNSS receiver 6 or in the driving dynamics data 16 from the inertial sensor 14. In this regard, although the filter may be in any form, a Kalman filter achieves this object most effectively with comparatively low computation resource requirement. Therefore, the filter 30 will preferably be a Kalman filter 30 below.

The Kalman filter 30 receives location data 32 for the vehicle 2 and comparison location data 34 for the vehicle 2. In the present embodiment, the location data 32 are generated from the driving dynamics data 16 in a strapdown algorithm 36, which is known from DE 10 2006 029 148 A1, for example. They contain the more precisely defined position information 18, but also other location data about the vehicle 2, such as the speed thereof, the acceleration thereof and the heading thereof. By contrast, the comparison location data 34 are obtained from a model 38 of the vehicle 2, which is first of all fed with the position data 8 from the GNSS receiver 6. From these position data 8, the model 38 then determines the comparison location data 34, which contain the same information as the location data 32. The location data 32 and the comparison location data 34 differ merely in the values thereof.

The Kalman filter 30 takes the location data 32 and the comparison location data 34 as a basis for calculating an error budget 40 for the location data 32 and an error budget 42 for the comparison location data. An error budget is intended to be understood below to mean an overall error in a signal, which overall error is made up of various single errors during the recording and transmission of the signal. In the case of the GNSS signal 12 and hence in the case of the position data 8, a corresponding error budget may be made up of errors in the satellite orbit, in the satellite clock, in the remainder of the refraction effects and of errors in the GNSS receiver 6. The error budget for a signal may include the deviation from the expected value of the signal and the variance in the signal.

The error budget 40 for the location data 32 and the error budget 42 for the comparison location data 34 are then supplied to the strapdown algorithm 36 and to the model 38 for correcting the location data 32 or the comparison location data 34 as appropriate. This means that the location data 32 and the comparison location data 34 are iteratively purged of the errors therein.

In the present embodiment, to produce the comparison location data 34, not only the position data 8 but also the vertical distances 26 and the vertical accelerations 28 are in. This has the advantage that vertical location data and location data that are dependent on the vertical location data in the comparison location data, such as a vertical acceleration, a pitch rate and a roll rate, can be calculated more precisely using the vertical distances 26 and the vertical accelerations 28.

If the GNSS signal 12 fails in a parking block, for example, then the vertical distances 26 and the vertical accelerations 28 can still be used to collect vertical location data about the vehicle 2 in order to calculate the vertical location of the vehicle 2, that is to say the specific location in a storey of the parking block, for example.

Conversely, data that can be calculated by the vertical position sensors 22 and body acceleration sensors 24 anyway, such as a roadway inclination 44, a roadway gradient 46, a vehicle mass 48, a distribution 50 of the vehicle mass 48 and a location 52 of the vehicle 2 in relation to the earth's gravitational field, could also be calculated more reliably in the model 38 by calculating the error budget 42.

While the above description constitutes the preferred embodiment of the present invention, it will be appreciated that the invention is susceptible to modification, variation, and change without departing from the proper scope and fair meaning of the accompanying claims.

The invention claimed is:

1. A method for processing sensor data in a vehicle by a processor, the processor being in communication with at least one driving dynamics sensor and at least one chassis sensor, the method comprising the steps of:
   recording, by the processor, driving dynamics data from the at least one driving dynamics sensor and chassis sensor data from the at least one chassis sensor for the vehicle, wherein the chassis sensor data from the at least one chassis sensor comprises data for determining a vertical location of the vehicle from a roadway the vehicle is located on,
   filtering, by the processor, driving dynamics data on the basis of the chassis sensor data or the chassis sensor data on the basis of the driving dynamics data, wherein filtered driving dynamics data or filtered chassis sensor data has an increased signal-to-noise band ratio than unfiltered driving dynamics data or unfiltered chassis sensor data.

2. The method as claimed in claim 1, wherein vertical location data for the vehicle from the chassis sensor data are combined with vertical driving dynamics data for the vehicle from the driving dynamics data in order to filter the driving dynamics data or the chassis sensor data.

3. The method as claimed in claim 2, wherein the vertical driving dynamics data comprises roll and pitch angle speeds and vertical accelerations of the vehicle.

4. The method as claimed in claim 1, wherein the chassis sensor data comprises vertical position data and/or body acceleration data.

5. The method as claimed in claim 1, further comprising the step of calculating a roadway inclination and/or roadway gradient on the basis of the chassis sensor data, wherein the roadway inclination and/or roadway gradient are filtered on the basis of the driving dynamics data for the purpose of filtering.

6. The method as claimed in claim 5, further comprising the step of calibrating a standstill for the vehicle on the basis of the filtered roadway inclination and/or roadway gradient.

7. A system for processing sensor data in a vehicle, the system comprising:
   a processor;
   a chassis sensor in communication with the processor, wherein the chassis sensor outputs chassis sensor data, wherein the chassis sensor data from the at least one chassis sensor comprises data for determining a vertical location of the vehicle from a roadway the vehicle is located on;
   the processor being configured to record driving dynamics data and chassis sensor data for the vehicle, and filter driving dynamics data on the basis of the chassis sensor data or the chassis sensor data on the basis of the driving dynamics data, wherein filtered driving dynamics data or filtered chassis sensor data has an increased signal-to-noise ratio than unfiltered filter driving dynamics data or unfiltered chassis sensor data.

8. The system as claimed in claim 7, wherein the processor is further configured to combine vertical location data for the vehicle from the chassis sensor data with vertical driving dynamics data for the vehicle from the driving dynamics data in order to filter the driving dynamics data or the chassis sensor data.

9. The system as claimed in claim 8, wherein the vertical driving dynamics data comprises roll and pitch angle speeds and vertical accelerations of the vehicle.

10. The system as claimed in claim 7, wherein the chassis sensor data comprises vertical position data and/or body acceleration data.

11. The system as claimed in claim 7, wherein the processor is further configured to calculate a roadway inclination and/or roadway gradient on the basis of the chassis sensor data, wherein the roadway inclination and/or roadway gradient are filtered by the processor on the basis of the driving dynamics data.

12. A system for processing sensor data in a vehicle, the system comprising:
   a processor;
   a chassis sensor in communication with the processor;
   the processor being configured to record driving dynamics data and chassis sensor data for the vehicle, and filter driving dynamics data on the basis of the chassis sensor data or the chassis sensor data on the basis of the driving dynamics data
   wherein the processor is further configured to calculate a roadway inclination and/or roadway gradient on the basis of the chassis sensor data, wherein the roadway inclination and/or roadway gradient are filtered by the processor on the basis of the driving dynamics data; and wherein the processor is further configured to determine a standstill for the vehicle on the basis of the filtered roadway inclination and/or roadway gradient.

\* \* \* \* \*